United States Patent [19]

Yen et al.

[11] Patent Number: 5,077,122
[45] Date of Patent: Dec. 31, 1991

[54] BIAXIALLY-ORIENTED POLYCARBONATE FILM FOR CAPACITORS

[75] Inventors: Shiao-Ping S. Yen, Altadena; Lynn E. Lowry, Shadow Hills; Clyde P. Bankston, Studio City, all of Calif.

[73] Assignee: California Institute of Technology, Pasadena, Calif.

[21] Appl. No.: 604,799

[22] Filed: Oct. 25, 1990

[51] Int. Cl.$^5$ .............................................. B32B 9/00
[52] U.S. Cl. ................................... 428/220; 428/332; 428/337; 428/412; 428/901
[58] Field of Search ............... 428/209, 412, 901, 220, 428/332, 337; 357/70; 361/397

[56] References Cited

U.S. PATENT DOCUMENTS

| | | | |
|---|---|---|---|
| 4,323,948 | 4/1982 | Mercier et al. | 361/323 |
| 4,363,162 | 12/1982 | Price | 29/25.42 |
| 4,434,209 | 2/1984 | Sasaki et al. | 428/416 |
| 4,459,637 | 7/1984 | Shedigian | 361/327 |
| 4,469,747 | 9/1984 | Sasaki et al. | 428/325 |
| 4,521,826 | 6/1985 | Shedigian | 361/314 |
| 4,533,611 | 8/1985 | Winkelmann et al. | 430/49 |
| 4,609,967 | 9/1986 | Shedigian | 361/314 |
| 4,621,301 | 11/1986 | Shedigian | 361/314 |
| 4,642,731 | 2/1987 | Shedigian | 361/319 |
| 4,672,506 | 6/1987 | Deguchi et al. | 361/323 |
| 4,704,325 | 11/1987 | Crocker | 428/323 |
| 4,738,882 | 4/1988 | Rayford et al. | 428/35 |
| 4,786,558 | 11/1988 | Sumiya et al. | 428/454 |
| 4,798,759 | 1/1989 | Dallman et al. | 428/220 |
| 4,812,941 | 3/1989 | Rice et al. | 361/15 |
| 4,867,881 | 9/1989 | Kinzer | 428/315.7 |
| 4,874,647 | 10/1989 | Yatsu et al. | 428/35.7 |
| 4,886,705 | 12/1989 | Sakamoto | 428/328 |
| 4,957,943 | 9/1990 | McAllister et al. | 428/315.5 |

FOREIGN PATENT DOCUMENTS 62-196140 8/1987 Japan .

OTHER PUBLICATIONS

H. S. Cole et al, "Laser processing for interconnect technology" pp. 92-96, 1988.
Y. S. Liu et al, "Interactions of Excimer Lasers with Polymers" pp. 698-702, 1988.
H. S. Cole et al, "Laser Photoetching of Polymers" pp. 241-245, 1986.
T. J. Chuang et al, "Laser-Photoetching Characteristics of Polymers with Dopants", pp. 277-288, 1988.
H. Hiraoka et al, "Dopant-induced ablation of polymers by a 308 nm excimer laser", pp. 463-465, Feb. 1988.
Y. S. Liu et al, "Photetching of Polymers with Excimer Lasers" pp. 133-137, 1987.
R. Srinivasan et al, "Ultraviolet Laser Ablation and Etching of Polymethyl Methacrylate Sensitized with an Organic Dopant"0 pp. 289-292, 1988.
S. P. S. Yen, L. Lowry, C. P. Bankston, V. F. Capozzi—Proceedings from the 1989 CEIDP Conference—Leesburg, VA—Oct. 29-Nov. 1, 1989-pp. 375-383 Entitled: Morphology and Dielectric Properties of Uniaxially and Biaxially Oriented Polycarbonate Capacitor Films.

Primary Examiner—Patrick J. Ryan
Attorney, Agent, or Firm—John A. Sarjeant

[57] ABSTRACT

Biaxially oriented, partially crystalline polycarbonate carbonate films have improved properties. For instance, a 2 $\mu$m film that has a degree of crystallinity of about 35% has an electrical breakdown strength of about 13.5 kv per mil. Such a film has a stretch ratio in the transverse direction of about 2.27/1 and in the machine direction of about 3.77/1.

4 Claims, 2 Drawing Sheets

BIAXIALLY-ORIENTED POLYCARBONATE FILM FOR CAPACITORS

STATEMENT OF THE INVENTION

We have correlated film morphology with capacitor performance through the characterization of numerous commercially available polycarbonate film. This data was then used to tailor film processing parameters to produce films with desirable morphologies, improved dimensional stability and electrical breakdown strengths.

We have found that if cast polycarbonate (PC) film (in the amorphous state) is first stretched in the transverse direction (T.D.) followed by the machine direction (M.D.) orientation above a specific stretching ratio and temperature, the degree of crystallinity in the film will increase substantially. Also, the stretching protocol influences the crystallite distribution which, in turn, impacts the mechanical behavior of the film. Film with a T.D. stretching ratios from about 2/1 to about 3/1 and a M.D. stretching ratios from about 3.5/1 to about 4.5/1 have improved properties. Particularly good properties were achieved with PC film having about two micron thickness and a T.D. stretching ratio of about 2.27/1 and a M.D. stretching ratio of about 3.7/1.

The stretching was done on commercially available machines.

DETAILED DESCRIPTION OF THE INVENTION

Biaxially oriented polycarbonate film was produced by transverse direction orientation at about 170° C. of PC solution cast film with a 2.27/1 stretch ratio. This was followed by machine direction orientation at several different stretch ratios as set out in Table 1. X-ray diffraction and differential scanning calorimetry were used to monitor the structure and properties of the PC film during film production in order to optimize the processing conditions.

Differential scanning calorimetry was used to determine the glass transition temperature ($T_g$) and melting point ($T_m$) of the films. These experiments were done on a DuPont 910 at a heating rate of 10° C./min in lidded aluminum pans.

X-ray diffraction was used to determine the degree of crystallinity of the PC films. To measure the degree of crystallinity in a single phase polymer by x-ray diffraction, the Hermans-Weidinger method can be used. This method depends on the existence of proportionality between the crystalline diffraction intensity $I_c$ and the crystaline portion of the material ($X_c$), and between the amorphous diffraction intensity $I_a$ and the amorphous portion ($X_a$). This means that the crystalline fraction is proportional to $I_c$ by some proportionality constant p, or $$X_c = pI_c$$

and by the same reasoning $$X_a = qI_a = 1 - X_c;$$

therefore $$X_c = 1 + \left[\frac{(qI_a)}{(pI_c)}\right]^{-1}.$$

If the value of $I_c$ are plotted against $I_a$, the points should lie on a straight line that represents the regression line of the correlation between $I_c$ and $I_a$. The points of intersection on the axis give the values for completely amorphous and completely crystalline samples, designated by $I_{c100} I_{a100}$. From this the numerical values of the proportionality constants can be determined by:

$$p = \frac{1}{I_{c100}} \quad q = \frac{1}{I_{a100}}$$

To determine the integrated densities ($I_c$) of the crystalline reflections, we used a Pearson VIII distribution.

The PC films used in this study contained either a low melting point ($T_{m1}$) phase, or a high melting point ($T_{m2}$) phase, or both $T_{m1}$ and $T_{m2}$ phases. If there is an appreciable difference in diffraction volume of the $T_{m1}$ and the $T_{m2}$ phase crystals, development of separate crystalline regression curves is required. We generated crystalline regression curves using the PC films containing $T_{m1}$ only as well as the PC films containing $T_{m2}$ only. The proportionality constant $p_{Tm1}$ and $p_{Tm2}$ and $q_{Tm1}$ and $q_{Tm2}$ are very similar and within experimental error, which indicates that the diffraction volume of $T_{m1}$ and $T_{m2}$ phases are very similar. Therefore, we can assume $I_c = I_{cTm1} + I_{cTm2}$ and use an apparent single phase approach to determine proportionality constants p=0.00265 and q=0.00029 to calculate absolute crystallinity of UX and BX PC film.

Figure 1:
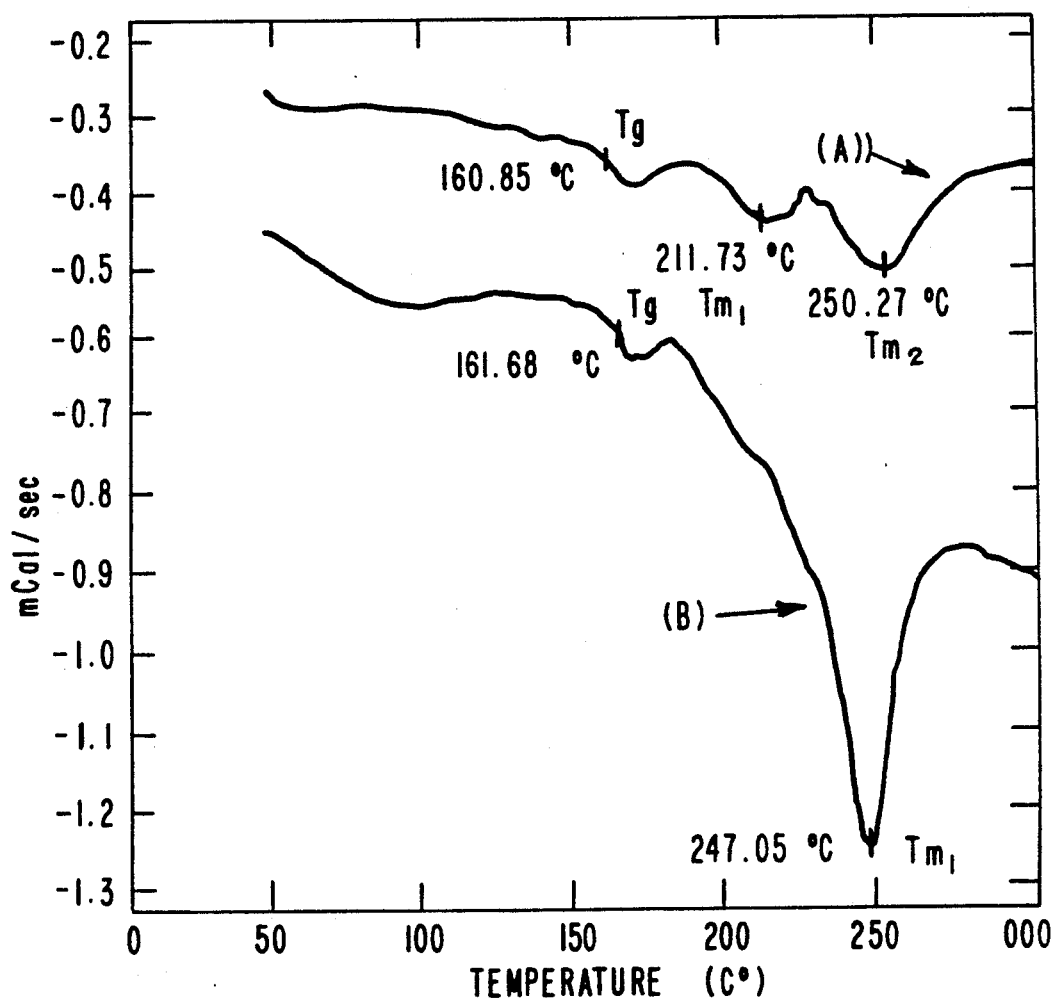
FIG. 1 show the differential scanning calorimetry graphs of commercial 2 μm UX polycarbonate film (A) and 2 μm BX polycarbonate film (B).

FIG. 1 shows the differential scanning colorimetry graphs of commercial 2 μm UX PC film (A) and 2 μm BX PC film (B). Both films have similar Tg (about 161° C. to 162° C.). The BX film exhibits only one Tm at 247° C. but the UX film shows two Tm, at 212° C. and 250° C. These results indicate that the BX film contains only a single crystalline phase but the UX film contains two crystalline phases with two distinct melting points. The low Tm phase in UX film can be expected to effect the film stability at elevated temperatures.

Table I gives the degree of crystallinity ($X_c$) for the various transverse and machine direction stretch ratios. In order to produce a single phase material with high $T_m$ and high crystallinity, the stretching ratios of T.D. 2.27/1 and M.D. 3.7/1 should be used.

TABLE I
EFFECTS OF BX FIM PROCESSING CONDITIONS ON MELTING POINT AND CRYSTALLINITY OF PC FILM
1. Film Thickness (μ)
2. Stretch ratio
    (a) Transverse Direction
    (b) Machine Direction
3. Melting Point °C. (Tm)
4. % Crystallinity

| 1 | 2(a) | 2(b) | 3 Tm$_{(1)}$ | 3 Tm$_{(2)}$ | 4 |
|---|---|---|---|---|---|
| 2.0 | 2.27/1 | 3.7/1 | — | 246.3 | 37.11 |
| 2.8 | 2.27/1 | 3.0/1 | 211.2 | 253.2 | 33.24 |

TABLE I-continued
EFFECTS OF BX FIM PROCESSING CONDITIONS ON MELTING POINT AND CRYSTALLINITY OF PC FILM 1. Film Thickness (μ)
2. Stretch ratio
   (a) Transverse Direction
   (b) Machine Direction
3. Melting Point °C. (Tm)
4. % Crystallinity

| 1 | 2(a) | 2(b) | 3 Tm$_{(1)}$ | 3 Tm$_{(2)}$ | 4 |
|---|---|---|---|---|---|
| 3.8 | 2.27/1 | 2.0/1 | 217.1 | 251.0 | 27.86 |

Figure 2:
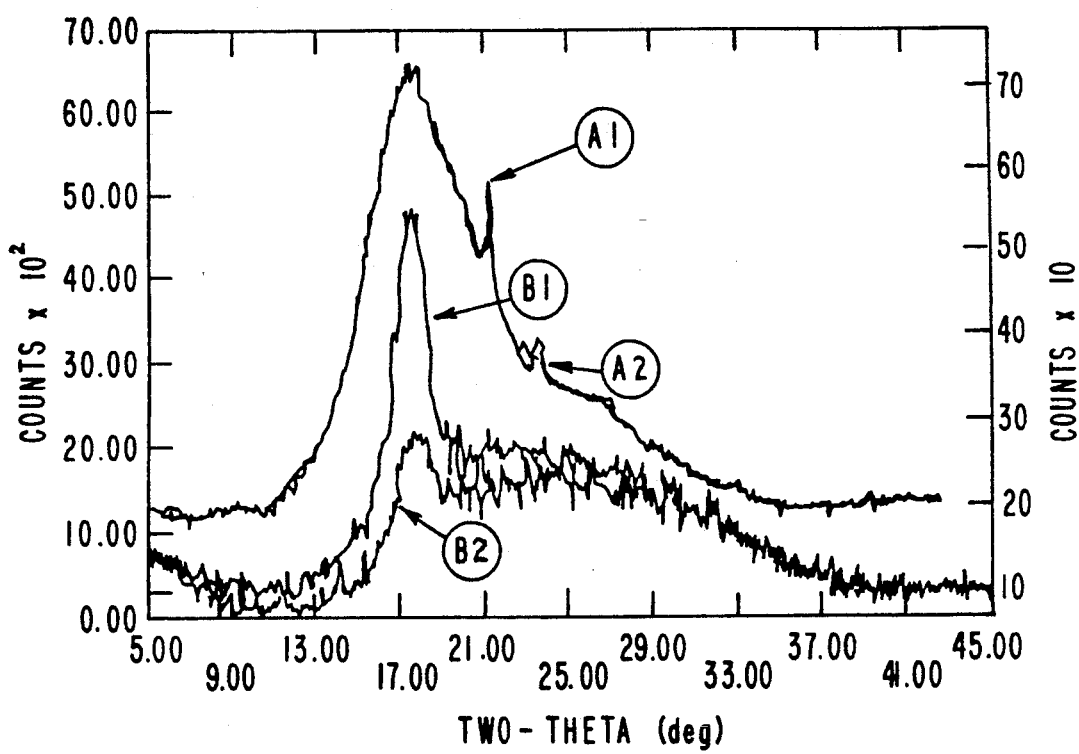
FIG. 2 sets out X-ray diffraction patterns of 2 μm BX polycarbonate film (A) and 2 μm UX polycarbonate film (B).

FIG. 2 sets out X-ray diffraction patterns of 2 μm UX film (B) and 2 μm BX film (A) along the machine (1) and transverse (2) directions. Scans A1 and A1 show the isotropic nature of the BX film, whereas Scans B1 and B2 show anisotropic behavior of commercial UX films whose crystalline counts are higher along the machine direction than along the transverse direction, indicating preferred crystallite orientation or distribution.

Table II lists the results of the direct current breakdown voltage studies of commercial UX and our BX films. We have found that electrical breakdown strength is a function of the degree of crystallinity. The breakdown strength of the 2 μm BX film ($X_c = 37.1\%$) is more than double the breakdown strength of 2 μm UX film ($X_c = 16.8\%$).

TABLE II
ELECTRICAL BREAKDOWN STREENGTH AND PERCENT CRYSTALLINITY OF UX AND BX ORIENTED FILM

1. Film Thickness
2. Film Type
3. % Crystallinity
4. Electrical Breakdown Voltage (BDV) (Volt/μ

| 1. | 2. | 3. | 4 |
|---|---|---|---|
| 2 | BX | 37.1 | 520 + 25 |
| 2.8 | BX | 33.2 | 581 + 18 |
| 3.8 | BX | 27.9 | 648 + 13 |
| 2 | UX* | 16.8 | 217 + 25 |
| 3 | UX* | 27.6 | 401 + 17 |
| 3.5 | UX* | 25.6 | 380 + 14 |

*Virgin PC Film streched in the machine direction.

Table III gives the results of the insulation resistance measurements taken on six 5.6 μF 30 vdc capacitors produced from 2μ BX film metallized with aluminum. Poor zero hour 100° C. insulation resistance is shown. This was probably due to contamination during capacitor formation. After 1000 hours at 100° C. and 42 vdc life test, it seems that the impurities absorbed on the capacitor film were then desorbed from the film. This resulted in improved 100° C. IR data.

TABLE III
100° C. INSULATION RESISTANCE (IR) VS. TIME (HOUR) OF 100° C. 42 VDC LIFE TEST OF BIAXIALLY ORIENTED 2 μm PC FILM CAPACITORS

| Test | Zero Hour | 250 Hours | 1000 Hours |
|---|---|---|---|
| 1** | 980 | — | — |
| 2 | 2197 | 2287 | 9927* |
| 3 | 2580 | 15259* | 20953* |
| 4 | 8513* | 19630* | 33520* |
| 5 | 2852 | 3257 | 14613* |
| 6 | 323 | 12255* | 25767* |

*5357 Megohms Min. at 30 vdc to pass
**Control --Zero hour only

Table IV sets out the percent dissipation factor against time of 100° C. 42 vdc life test of BX 2 μm PC film capacitors. After 1000 hours at 100° C. and 42 vdc life test, the percent dissipation factor remained constant. This indicates no degradation of BX PC film.

TABLE IV
PERCENT DISSAPATION FACTOR (DF) (25° C. 0.1 kHz) VS TIME (HOUR) OF 100° C. 42 VDC LIFETEST OF BIAXIALLY ORIENTED 2 μM PC FILM CAPACITORS

| Test | Zero Hour | 250 Hours | 1000 Hours |
|---|---|---|---|
| 1 | 0.07 | — | — |
| 2 | 0.08 | 0.07 | 0.08 |
| 3 | 0.07 | 0.08 | 0.08 |
| 4 | 0.08 | 0.08 | 0.09 |
| 5 | 0.11 | 0.11 | 0.12 |
| 6 | 0.07 | 0.07 | 0.07 |

*Control--zero hour only

Table V gives the capacitance stability of the capacitors after 1000 hours at 100° C. and 42 vdc life test. The dimensional stabliity of the BX film was good after prolonged heating at 100° C.

TABLE V
TEMPERATURE COEFFICIENT (−55° C. TO 125° C.) OF BIAXIALLY ORIENTED 2 μm PC FILM CAPACITORS 100° C. VDC LIFE TEST RESULTS

| Test | 25° C. | 125° C. | 50° C. | 25° C.* | −55° C. | 25° C. |
|---|---|---|---|---|---|---|
| Initial Measurement (Zero Hours. 100° C. 42 vdc Life Test) | | | | | | |
| 1 | −.01 | −.52 | −.22 | 5.7909 | −1.02 | +.03 |
| 2 | −.04 | −.59 | −.30 | 5.9641 | −.83 | +.06 |
| 3 | −.02 | −.55 | −.25 | 5.7931 | −.91 | +.05 |
| 4 | −.04 | −.59 | −.27 | 5.7973 | −1.02 | +.02 |
| 5 | −.01 | −.53 | −.22 | 5.5212 | −1.03 | +.03 |
| 6 | +0.00 | −.65 | −.23 | 6.2263 | −1.11 | +.04 |
| 1000 Hours (100° C. 42 vdc Life Test) | | | | | | |
| 1** | — | — | — | — | — | — |
| 2 | −.01 | −.47 | — | 5.9571 | −.44 | +.11 |
| 3 | −.02 | −.40 | — | 5.7883 | −1.18 | +.10 |
| 4 | −.04 | −.44 | — | 5.7912 | −.70 | +.08 |
| 5 | −.04 | −.41 | — | 5.5170 | −.81 | +.08 |

*Capacitance in μF at 25° C.
**Control - Zero Time only

These test establish that the degree of crystallinity in the PC film is related to the electrical breakdown strength. Increasing crystallinity in films of equivalent thickness results in higher breakdown voltages. This is consistent with the premise that crystalline boundaries are sites of electrical weakness. Biaxial film orientation during fabrication can produce a more isotropic distribution of crystallites than uniaxial stretching. The degree of crystalline orientation will strongly impact the load bearing properties and dimensional stability of the film.

PC capacitor films which have a degree of crystallinity from about 30% to about 50% have improved electrical breakdown strengths. For example, a 2 μm film with a crystallinity of approximately 37% has a breakdown strength of about 13.5 kv per mil.

We claim:

1. A biaxially oriented polycarbonate capacitor having a transverse stretch ratio from about 2/1 to about 3/1 and a machine direction stretch ratio from about 3.5/1 to about 4.5/1.

2. A film of claim 1 having a transverse stretch ratio of about 2.27/1 and a machine direction stretch ratio of about 3.7/1.

3. A film of claim 1 which has a degree of crystallinity from about 30% to about 50%.

4. A film of claim 1 which has a thickness of about 2 μm, a degree of crystallinity of about 37% and an electrical breakdown strength of approximately 13.5 kv per mil.

* * * * *